May 9, 1939.   W. H. CUTTINO   2,157,886

PREVENTION OF INDUCTIVE INTERFERENCE

Filed July 9, 1938

WITNESSES:
Edward Michaels
F. P. Lyle

INVENTOR
William H. Cuttino.
BY
ATTORNEY

UNITED STATES PATENT OFFICE 2,157,886

PREVENTION OF INDUCTIVE INTERFERENCE

William H. Cuttino, Wilkinsburg, Pa., assignor to Westinghouse Electric & Manufacturing Company, East Pittsburgh, Pa., a corporation of Pennsylvania Application July 9, 1938, Serial No. 218,315

9 Claims. (Cl. 171—97)

The present invention relates to the prevention of inductive interference between transmission or distribution lines and adjacent communication lines, and, more specifically, it relates to a method of preventing the flow of harmonic currents in the neutral conductor of a three-phase, four-wire transmission line.

When a communication circuit, such as a telephone or telegraph line, is located adjacent to an electric power transmission or distribution line, and especially if they run generally parallel to each other, the mutual induction between the two circuits causes induced electromotive forces in the communication line, which seriously interfere with the proper reception of messages carried by it. In the case of a three-phase, three-wire transmission line with a balanced load, interference can be completely eliminated by proper transposition, but if the transmission line has a grounded neutral conductor, transposition of the phase conductors will have no effect on interference caused by currents flowing in the neutral, and it is necessary to provide some means to prevent the flow of such currents in order to avoid interference.

One case in which troublesome interference may be caused by neutral currents occurs when a star-connected capacitor bank is used on a three-phase line having a grounded neutral conductor with the neutral point of the capacitor bank connected to the neutral conductor. Since the capacitor bank constitutes a balanced load, there is no voltage of fundamental frequency between the neutral point of the capacitor bank and ground and, therefore, no fundamental current will flow in the neutral. In some cases, however, currents of third harmonic frequency and its multiples will flow in the neutral, since the neutral point for the harmonics is not necessarily the same as that for the fundamental. The interference caused by such harmonics is particularly objectionable since, with the frequencies usually used for power transmission, the third harmonic approaches the range of frequencies used in telephone work.

A method of preventing the flow of harmonic currents in such cases is disclosed in a copending application of R. E. Marbury, Serial No. 180,405, filed December 17, 1937 and assigned to Westinghouse Electric & Manufacturing Company. The scheme disclosed in this application consists in using a saturable reactor connected between the neutral point of the capacitor bank and the neutral conductor of the system. This reactor is designed to have high impedance to currents of harmonic frequency but to saturate at approximately 50% of the line-to-ground voltage, so that in the event of failure of one of the capacitors, the reactor will permit a large enough flow of current of fundamental frequency to cause operation of a circuit interrupting device to disconnect the faulty capacitor from the line. If the faulty capacitor only is disconnected, an unbalanced voltage will exist between the neutral point of the capacitor bank and ground causing a continuous flow of current through the reactor. This requires a reactor of fairly large size which is capable of carrying a substantial flow of current for an extended period. If a circuit breaker is used to disconnect all three phases in the event of failure of one of the capacitors, the reactor is required to carry current only momentarily and can, therefore, be made much smaller and less expensive. A circuit breaker is a fairly expensive piece of equipment, however, especially for the higher voltages, and the saving effected by the use of a smaller reactor is more than offset by the cost of the circuit breaker.

It is the object of the present invention, therefore, to provide a scheme for the prevention of harmonic currents caused by a star-connected capacitor bank in the neutral conductor of a three-phase, four-wire transmission or distribution line by means of a saturable reactor in which the reactor will not be required to carry current continuously, and in which only one of the three phases of the capacitor bank will be disconnected from the line in the event of failure of a capacitor.

More specifically, the object is to provide a system of the type described above in which the reactor will be automatically short-circuited in the event of failure of one of the capacitors. The invention may be carried out in various ways by providing means to automatically short-circuit the reactor either in response to the flow of current through it or in response to the temperature rise caused by the current. Thus, either current responsive or temperature responsive devices may be used in any suitable arrangement to complete a shunt circuit around the reactor when a substantial flow of current through it occurs.

The invention will be more fully understood from the following detailed description taken in connection with the accompanying drawing, in which.

Figure 1:
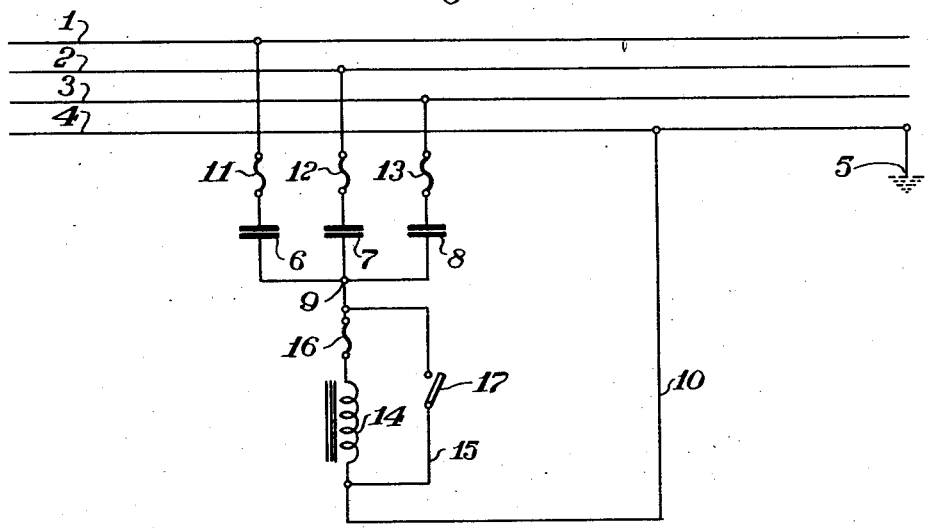
Figure 1 shows diagrammatically one embodiment of the present invention.

Referring to Fig. 1, the reference numerals 1, 2 and 3 designate the phase conductors of a three-phase, four-wire transmission or distribution line, and the reference numeral 4 designates the neutral conductor, which is grounded as indicated at 5. A star-connected bank of capacitors comprising three capacitors 6, 7 and 8, is connected to the transmission line and its neutral point 9 is connected to the neutral conductor 4 by a connection 10. The capacitors 6, 7 and 8 are connected to the phase conductors 1, 2 and 3 through fuses 11, 12 and 13, respectively. In order to prevent the flow of harmonic currents in the neutral, a saturable reactor 14 is inserted in the neutral connection 10. This reactor is preferably similar to the reactor disclosed in the above-mentioned copending application, and should be designed to have high impedance to harmonic currents and to saturate at approximately 50% of the line-to-ground system voltage so that, in the event of failure of one of the capacitors 6, 7 or 8, it will permit the passage of a large enough current of fundamental frequency to blow the corresponding fuse and disconnect the faulty capacitor from the line.

When one of the fuses 11, 12 or 13 blows as a result of failure of its capacitor, an unbalanced voltage of fundamental frequency exists between the neutral point 9 and ground, causing a continuous flow of current in the neutral connection 10. If the reactor 14 were required to carry this current, it would have to be large and relatively expensive. In order to permit the use of a small and inexpensive reactor, therefore, a shunt 15 is provided to short-circuit the reactor, so that it will carry current only momentarily. In order to short-circuit the reactor in response to the flow of current through it, any suitable current responsive arrangement can be used. One suitable arrangement for this purpose, as shown in Fig. 1, consists of a fuse 16 connected in series with the reactor and a switch 17 which is arranged to be closed automatically in response to blowing of the fuse 16. This fuse can be smaller than the fuses 11, 12 and 13, since it only carries the neutral current and is intended to operate as soon as a substantial flow of current occurs in the neutral connection 10. Any of the well known arrangements used in reclosing fuses can be used for releasing a latch and permitting the switch 17 to close in response to blowing of the fuse 16. It will be seen that with this scheme the reactor 14 is required to carry current only momentarily and can, therefore, be made relatively small and inexpensive, while at the same time, individual fuses can be used with each of the capacitors and the expense of a circuit breaker is thus avoided.

Figure 2:
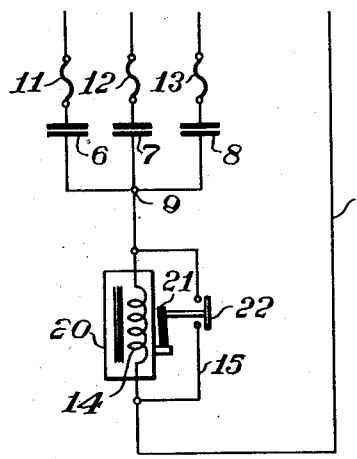
Figs. 2 and 3 are diagrams showing alternative embodiments.

Another embodiment of the invention is shown in Fig. 2, in which the reactor is short-circuited in response to the temperature rise caused by the flow of current. In this figure, 20 indicates a case or container in which the reactor is mounted. A thermostat 21 of the bimetallic or other suitable type is mounted on the case and operates to close the contacts 22 in the shunt 15 when the temperature of the case 20 has risen to a predetermined value. With this arrangement, the response is not instantaneous when a flow of current starts in the neutral connection, since a certain lag occurs while the temperature of the case is increasing to the point where it will cause the thermostat to operate. In most cases, however, this time lag is unimportant and can be made quite short if desired.

Figure 3:
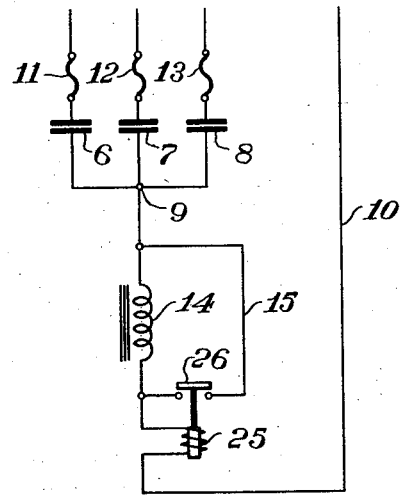

Another embodiment of the invention is shown in Fig. 3, in which a current responsive element in the neutral connection is used to close a set of contacts in the shunt around the reactor. As shown in this figure, the current coil 25 of a contactor 26 is connected in series with the reactor 14 in the neutral connection 10. The flow of current through the reactor as a result of failure of one of the capacitors will cause the coil 25 to operate to close the contacts and short-circuit the reactor. This arrangement can be made to operate practically instantaneously, and thus the reactor will be required to carry current only for a small fraction of a second. It will be understood, of course, that any suitable type of current element can be used in this way to close a set of contacts in the shunt 15.

It will be obvious that many other embodiments of the invention are possible, and that any arrangement can be used which will complete a shunt circuit around the reactor in response to the flow of current through the reactor itself or in the neutral connection 10 and thus to short-circuit the reactor and avoid the necessity of designing it to carry a substantial flow of current continuously. In this way it is possible to use a small, inexpensive reactor while at the same time avoiding the necessity of using a circuit breaker or equivalent device to disconnect all three phases of the capacitor bank in the event of the failure of one of the capacitors.

Although certain specific embodiments of the invention have been illustrated and described, it is to be understood that it is not limited to these particular arrangements but, in its broadest aspects, it includes all equivalent embodiments and modifications which come within the scope of the appended claims.

I claim as my invention:

1. In a polyphase system of electrical transmission or distribution having a grounded neutral conductor, a star-connected bank of capacitors connected to the system and having its neutral point connected to the neutral conductor, means in the neutral connection for substantially preventing the flow of current of frequency higher than the fundamental but adapted to permit the flow of current of fundamental frequency in the event of failure of one of the capacitors, and means operative when current of fundamental frequency flows in the neutral connection for short-circuiting said first mentioned means.

2. In a polyphase system of electrical transmission or distribution having a grounded neutral conductor, a star-connected bank of capacitors connected to the system and having its neutral point connected to the neutral conductor, means in the neutral connection for substantially preventing the flow of current of frequency higher than the fundamental but adapted to permit the flow of current of fundamental frequency in the event of failure of one of the capacitors, and means for short-circuiting said first mentioned means when current flows in the neutral connection.

3. In a polyphase system of electrical transmission or distribution having a grounded neutral conductor, a star-connected bank of capacitors connected to the system and having its neutral point connected to the neutral conductor, means in the neutral connection for substantially preventing the flow of current of frequency higher than the fundamental but adapted to permit the flow of current of fundamental frequency in the event of failure of one of the capacitors, and means responsive to the flow of current in the neutral connection for short-circuiting said first mentioned means.

4. In a polyphase system of electrical transmission or distribution having a grounded neutral conductor, a star-connected bank of capacitors connected to the system and having its neutral point connected to the neutral conductor, a reactor in the neutral connection adapted to substantially prevent the flow of current of frequency higher than the fundamental, and means operable in response to current flow in the neutral connection for short-circuiting the reactor.

5. In a polyphase system of electrical transmission or distribution having a grounded neutral conductor, a star-connected bank of capacitors connected to the system and having its neutral point connected to the neutral conductor, a saturable reactor in the neutral connection adapted to substantially prevent the flow of current of frequency higher than the fundamental but to permit the flow of current of fundamental frequency in the event of failure of one of the capacitors, and means responsive to the flow of current in the reactor for short-circuiting it.

6. In a system of electrical transmission or distribution having a plurality of phase conductors and a grounded neutral conductor, a star-connected capacitor bank, a current-responsive circuit interrupting device connected between each capacitor and one of the phase conductors, a connection between the neutral point of the capacitor bank and the neutral conductor, a saturable reactor in the neutral connection adapted to substantially prevent the flow of current of harmonic frequencies, and means operable in response to current flow through the neutral connection for short-circuiting the reactor.

7. In a system of electrical transmission or distribution having a plurality of phase conductors and a grounded neutral conductor, a star-connected capacitor bank, a current-responsive circuit interrupting device connected between each capacitor and one of the phase conductors, a connection between the neutral point of the capacitor bank and the neutral conductor, a saturable reactor in the neutral connection adapted to substantially prevent the flow of currents of harmonic frequencies, but to permit the flow of current of fundamental frequency in the event of failure of one of the capacitors, and means for short-circuiting the reactor when such current flow occurs.

8. In a system of electrical transmission or distribution having a plurality of phase conductors and a grounded neutral conductor, a star-connected capacitor bank, a current-responsive circuit interrupting device connected between each capacitor and one of the phase conductors, a connection between the neutral point of the capacitor bank and the neutral conductor, a saturable reactor in the neutral connection adapted to substantially prevent the flow of currents of harmonic frequencies, but to permit the flow of current of fundamental frequency in the event of failure of one of the capacitors, and means operable in response to current flow through the reactor for short-circuiting it.

9. In a system of electrical transmission or distribution having a plurality of phase conductors and a grounded neutral conductor, a star-connected capacitor bank, a current-responsive circuit interrupting device connected between each capacitor and one of the phase conductors, a connection between the neutral point of the capacitor bank and the neutral conductor, a saturable reactor in the neutral connection adapted to substantially prevent the flow of currents of harmonic frequencies, but to permit the flow of current of fundamental frequency in the event of failure of one of the capacitors, and means operable in response to current flow in the neutral connection for short-circuiting the reactor.

WILLIAM H. CUTTINO.